United States Patent

Melville et al.

[11] Patent Number: 6,046,720
[45] Date of Patent: Apr. 4, 2000

[54] POINT SOURCE SCANNING APPARATUS AND METHOD

[75] Inventors: Charles D. Melville, Issaquah; Michael Tidwell, Seattle, both of Wash.

[73] Assignee: University of Washington, Seattle, Wash.

[21] Appl. No.: 09/072,013

[22] Filed: May 4, 1998

Related U.S. Application Data

[60] Provisional application No. 60/045,840, May 7, 1997.

[51] Int. Cl.⁷ ..................................................... G09G 3/34
[52] U.S. Cl. .................................. 345/108; 345/8; 345/9; 359/198; 359/630
[58] Field of Search .............................. 345/7, 8, 9, 108, 345/111; 359/198, 199, 213, 214, 223, 630, 631

[56] References Cited

U.S. PATENT DOCUMENTS

| | | | |
|---|---|---|---|
| 5,021,773 | 6/1991 | Browne | 340/764 |
| 5,295,014 | 3/1994 | Toda | 359/202 |
| 5,467,104 | 11/1995 | Furness, III et al. | 345/8 |
| 5,493,440 | 2/1996 | Souda et al. | 359/341 |
| 5,550,558 | 8/1996 | Salam | 345/111 |
| 5,557,444 | 9/1996 | Melville et al. | 359/199 |
| 5,587,836 | 12/1996 | Takahashi et al. | 359/630 |
| 5,596,339 | 1/1997 | Furness, III et al. | 345/8 |
| 5,659,327 | 8/1997 | Furness, III et al. | 345/8 |
| 5,694,237 | 12/1997 | Melville | 359/214 |
| 5,701,132 | 12/1997 | Kollin et al. | 345/8 |
| 5,721,564 | 2/1998 | Patel | 345/109 |
| 5,748,172 | 5/1998 | Song et al. | 345/111 |
| 5,751,465 | 5/1998 | Melville et al. | 359/213 |
| 5,812,307 | 9/1998 | Naganuma | 359/341 |

*Primary Examiner*—Richard A. Hjerpe
*Assistant Examiner*—Kevin Nguyen
*Attorney, Agent, or Firm*—Steven P. Koda

[57] ABSTRACT

A scanning display device directly scans a light source along at least one scanning path, rather than scanning a light beam emitted from such source along such scanning path. By scanning the light source a smaller, lighter weight scanner without a mirror can be used to achieve light source scanning along the desired scan path. A resonant cantilever translates one or more point sources (e.g., one for a monochromatic display; red, green and blue for an RGB display). The cantilever motion is driven by an electromagnetic drive circuit or by a piezoelectric drive actuator. The light source is one or more light emitting diode point sources, one or more a fiber optic point sources, or one or more light emitting polymer light sources.

53 Claims, 5 Drawing Sheets

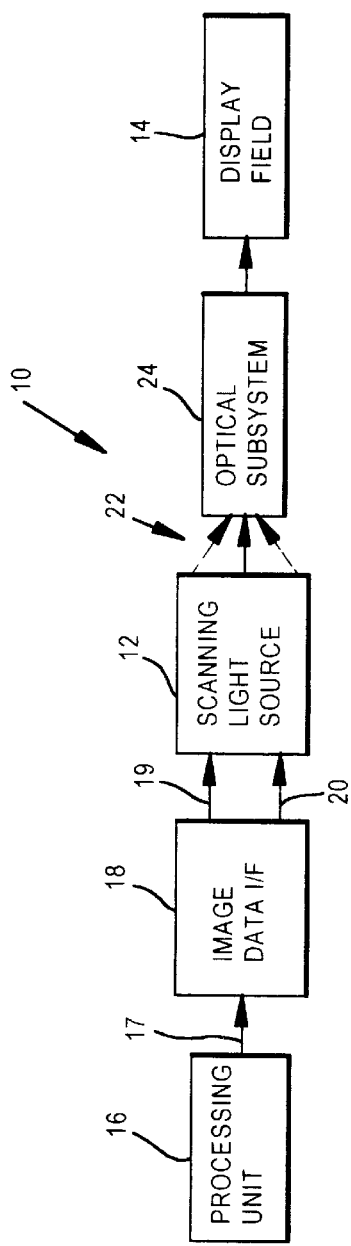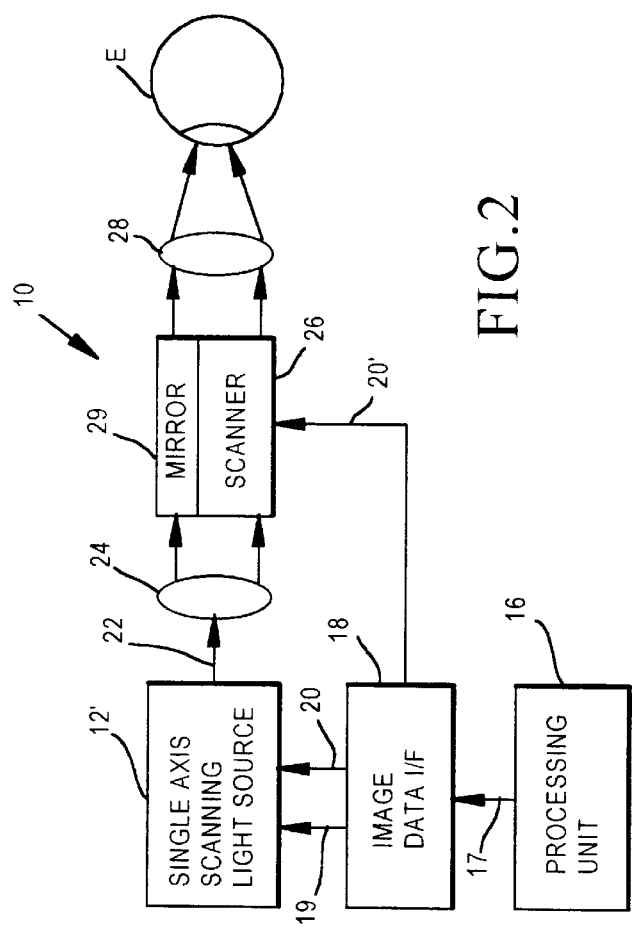

POINT SOURCE SCANNING APPARATUS AND METHOD

CROSS REFERENCE TO RELATED APPLICATIONS

This invention is related to U.S. Provisional patent application, Ser. No. 60/045,840 filed May 7, 1997 for Point Source Scanning and Sequentially Scanning RGB Point Sources.

BACKGROUND OF THE INVENTION

This invention relates to scanning display devices, and more particularly to light sources and scanners for scanning display devices.

In a typical scanning display device light is emitted from a light source, collimated through a lens, then passed through a scanner. The scanner deflects the light along a scanning pattern. The scanned light is directed toward a viewing screen, or in a retinal display, toward a viewer's eye. An image is perceived by a viewer's eye, either from viewing the screen or from the direct scanning of light on the eye.

For a retinal display, an eyepiece directs the light toward the viewer's eye. An "exit pupil" occurs shortly beyond the eyepiece in an area where a viewer's eye pupil is to be positioned. A viewer looks into the eyepiece to perceive the image. A small exit pupil allows persons who ordinarily wear corrective lenses to see the scanned image clearly without glasses. But generally, a small exit pupil is disadvantageous because one must carefully align the eye with the exit pupil to see the image. Slight movement of the eye, such as into one's peripheral viewing area, would cause the image to disappear. Accordingly, it is generally desirable to have large exit pupils.

The size of the exit pupil is determined by the aperture stop of the display and the optical magnification of components along the light path between the optical stop and the viewer's eye. Typically, the horizontal scanner of a raster scanning display is the limiting aperture. The exit pupil diameter is equal to the horizontal scanner aperture times the tangent of half the optical scan angle of the horizontal scanner divided by the tangent of half the field of view angle. Scanners that scan at high horizontal scanning speeds have small apertures, small scan angles or both. This results in a small exit pupil. To increase the exit pupil size, it is desirable to have a larger aperture. To achieve a large aperture a larger scanning mirror may be used. The drawback of a larger mirror is the increase in system size and weight, and the additional power required to move the mirror. Accordingly, another solution is desired for increasing exit pupil size while minimizing system size and weight.

SUMMARY OF THE INVENTION

A scanning display scans light along a prescribed scanning pattern. In a raster scanning display the light is scanned along a horizontal scanning path and along a vertical scanning path. According to the invention, a scanning display device directly moves a light emitter along at least one of the display scanning paths. For example, in a raster scanning display the light emitter is physically moved along either one or both of the horizontal and vertical scanning paths, rather than scanning only the emitted light beam along such either one or both scanning paths. In a preferred embodiment the light emitters are scanned along a horizontal scanning path. The emitted beam then is deflected by a mirror along a vertical scanning path. In another embodiment the light emitter is scanned along both the horizontal scanning path and the vertical scanning path. An advantage of scanning the light source is that a smaller, lighter weight display is achieved.

According to one aspect of the invention, a resonant cantilever translates one or more point sources (e.g., one point source for a monochromatic display; respective red, green and blue point sources for an RGB display). In one embodiment the cantilever motion is driven by an electromagnetic drive circuit. In another embodiment the cantilever motion is driven by a piezoelectric drive actuator.

According to another aspect of the invention, the light source is one or more light emitting diode point sources, one or more fiber optic point sources, or one or more light emitting polymer light sources.

According to another aspect of this invention, a scanning display apparatus includes an image signal source operative to produce an image signal, a scanning signal source generating a scanning signal, a light emitter coupled to the image signal source and responsive to the image signal to emit light, a support carrying the light emitter at a first portion of the support, and a drive circuit coupled to the support and responsive to the scanning signal to move at least the first portion of the support through a predetermined angular range. The light emitter is moved through the predetermined angular range to scan the emitted light along a desired scan path.

According to another aspect of the invention, the support carries a plurality of light emitting devices emitting respective beams of colored light. The plurality of light emitting devices are aligned in a common plane with the movement of the plurality of light emitters caused by the drive circuit occurring within the common plane. The image signal is operative with a timing to modulate each one of the light emitters so that the plurality of light emitters cumulatively define an image pixel of a desired color at a given pixel location as each one of the plurality of point sources moves through the corresponding position to address said image pixel.

According to another aspect of the invention, the drive circuit moves the support through the predetermined angular range at a resonant frequency of the support and light emitter(s).

According to another aspect of the invention, the display is a retinal display having an eyepiece which receives the emitted light. The emitted light is focused to define an exit pupil at a location adjacent the eyepiece where a viewer's eye may be positioned to perceive an image generated by the apparatus.

According to another aspect of the invention, the drive circuit scans the light emitters along a first scanning axis. A scanning device receives the emitted light at a mirror. The scanning device moves the mirror along a second scanning axis. In some embodiments the first scanning axis is a horizontal axis and the second scanning axis is a vertical scanning axis. The scanning along the two axes defines a raster scanning path for scanning an image.

According to another aspect of the invention, a method of scanning an optical beam responsive to a scanning signal includes modulating a light emitter with an image signal to generate a modulated light beam of image pixel components, receiving a scanning signal at a drive circuit operative to drive motion of a support, and moving the support through a predetermined angular range as controlled by the drive circuit. The light emitter is moved through the predetermined angular range with the support to scan the emitted light along a desired scan path.

According to another aspect of this invention, the scanning signal is periodic having a period which includes a first portion and a second portion. The step of moving includes driving motion of the support and light emitter in a first direction to a first extreme position in response to the scanning signal during the first portion of the scanning signal period. The step of moving also includes driving motion of the support and light emitter in a second direction opposite the first direction to a second extreme position in response to the scanning signal during a second portion of the scanning signal period. The steps of driving in a first direction and driving in a second direction are repeated for subsequent periods of the scanning signal to generate oscillatory motion of the support and light emitter in alternating first and second directions.

These and other aspects and advantages of the invention will be better understood by reference to the following detailed description taken in conjunction with the accompanying drawings.

BRIEF DESCRIPTION OF THE DRAWINGS

FIG. 1 is a block diagram of a display apparatus which moves light emitter(s) along one scanning axis and deflects an emitted light beam along a second scanning axis according to an embodiment of this invention;

FIG. 2 is a block diagram of a display apparatus which moves light emitter(s) along two axes according to another embodiment of this invention;

DESCRIPTION OF SPECIFIC EMBODIMENTS

Overview

Figure 3:
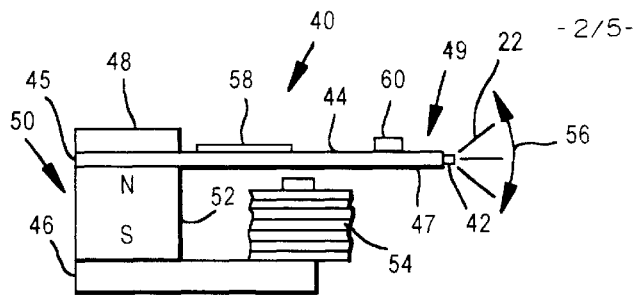
FIG. 3 is a side view of an apparatus for scanning a light emitter along a scanning axis according to an embodiment of this invention.

FIG. 1 shows a block diagram of a scanning display 10 having a scanning light source 12 according to an embodiment of this invention. The display 10 generates and scans light to create color or monochrome images at a display field 14. In some embodiments the display field is a viewing screen such as a cathode ray tube display screen. In a retinal display embodiment the display field is the retina of a viewer's eye. Varying embodiments of the display 10 achieve narrow to panoramic fields of view and low to high resolutions.

The scanning display 10 includes a processing unit 16, an image data interface 18, the scanning light source 12, and an optical subsystem 24. In some embodiments the display field 14 is an electrical or optical device included as part of the display 10. The image scanned by the display 10 is derived from an image content signal 17 generated by the processing unit 16. The processing unit 16 may be part of a computer, video device or another digital or analog image source device. The image content signal 17 is an RGB signal, NTSC signal, VGA signal or other formatted color or monochrome video or imaging signal. The processing unit 16 outputs the image content signal 17 to the image data interface 18.

The image data interface 18 generates an image signal 19 from the image content signal 17 for controlling the light emitted from the light source 12. The image data interface 18 also generates one or more scanning signals 20 from the image content signal 17.

The scanning light source 12 includes one or more point sources of light. In one embodiment a monochromatic light source is used. In another embodiment red, green, and blue light sources are used. In various embodiments each light source is formed by a light emitting diode, a laser, or a light emitting plasma source. In some applications, the light source may be located remotely by coupling light into an optical fiber. Preferably the emitted light 22 is spatially coherent. In one embodiment the light source 12 is modulated as a function of the image signal 19. In another embodiment the light source includes a modulator which responds to the image signal 19 to modulate light from the light source. The light source 12 is a scanning light source which moves light emitters along a scanning path. The emitted light 22 passes through the optical subsystem 24 and onward to the display field 14.

FIG. 2 shows a block diagram of a scanning display 10' in which like parts relative to the display 10 of FIG. 1 are given the same part numbers. The scanning display 10' includes a single axis scanning light source 12' which moves light emitters along a first scanning axis. Emitted light 22 passes through the optical subsystem 24 and impinges upon a mirror 29 at a scanner 26. The scanning light source 12' receives the scanning signal 20, while the scanner 26 receives another scanning signal 20'. Both scanning signals 20, 20' are received from the image data interface 18. The scanning source 12' is operative to move a light emitters along the first scanning path, while the scanner 26 is operative to deflect the emitted light 22 along a second scanning path. The scanner mirror 29 is driven by an electromagnetic drive circuit or a piezoelectric drive circuit. In other embodiments the scanner 26 includes acoustooptical deflectors, electro-optical deflectors, rotating polygons or galvanometers to perform the light deflection along the second scanning path. The timing of the scanner 26 operation is determined by the scanning signal 20'. In a preferred embodiment the scanning signals 20, 20' are periodic scanning signals.

In a specific embodiment the light source 12' moves light emitters along a horizontal scanning axis at a horizontal scanning frequency determined by the scanning signal 20, while the scanner 26 deflects the emitted light 22 along a vertical scanning path at a vertical scanning frequency determined by the scanning signal 20'. For a retinal display embodiment the scanned light passes through an eyepiece 28 and into the viewer's eye E. The eyepiece 28 focuses the emitted light to define an exit pupil at a location adjacent the eyepiece 28 where a viewer's eye may be positioned to perceive an image.

Scanning Light Source

Figure 4:
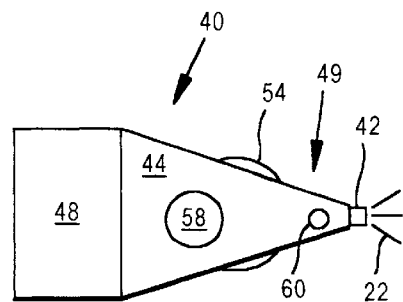
FIG. 4 is a top view of the apparatus of FIG. 3.

FIGS. 3–4 show a single-axis scanning point source 40 embodying the scanning source 12, 12' of FIGS. 1 and 2. The scanning source 40 includes a light emitter 42 which emits a coherent beam of light. In one embodiment the light emitter 42 is a laser diode. In another embodiment, the light emitter 42 is a light emitting diode with optics for making the output light coherent. The light emitter 42 is carried by a support 44. In one embodiment the support 44 is formed of spring steel and is a cantilever type of spring. The cantilever spring has a spring constant determined by its length, width and thickness. Preferably, the support 44 is resonant with a high Q value such that once the support starts moving very little energy is lost. As a result, very little energy is added during each period of movement to maintain a constant amplitude of motion of the support 44. For a high Q system the energy loss per cycle is less than 0.001%. The support 44 is anchored at one end 45 and is free at an opposite end 47. The frequency of scanning is determined by the scanning signal 20'. However, for a high Q system, the scanning signal 20' is preferably chosen to match the resonant frequency of the support 44 for the most efficient energy transfer. The frequency of the scanning signal 20' can be manually matched to the resonant frequency of the support or may be actively controlled by monitoring the motion of the support, as described U.S. Pat. No. 5,694,237 issued Dec. 2, 1997 entitled "Position Detection of Mechanical Resonant Scanner Mirror," naming inventor Charles D. Melville, which is incorporated herein by reference. Preferably, the scanning source 40 includes a position sensor for monitoring the position of the support 44 and light emitter 42. In some embodiments a common mode rejection piezoelectric sensor 58 is used. In other embodiments a sensor 60 responsive to changing inertia is used. An exemplary sensor 58 is described in such U.S. Pat. No. 5,694,237 issued Dec. 2, 1997 entitled "Position Detection of Mechanical Resonant Scanner Mirror."

The scanning source 40 also includes a base 46, a cap 48 and an electromagnetic drive circuit 50, formed by a permanent magnet 52 and an electromagnetic coil 54. The anchored end 45 of the support 44 is held to the permanent magnet 52 by the cap 48. The permanent magnet 52 is mounted to the base 46. The electromagnetic coil 54 receives the scanning signal 20 causing a magnetic field to act upon the support 44. The scanning signal 20 is a periodic signal having a changing amplitude. In a preferred embodiment the period corresponds to the natural resonant frequency of the moving parts (e.g., the support 44 and light emitter(s)). As a result the electromagnetic coil generates a changing magnetic field which moves at least a portion 49 of the support 44 through a prescribed angular range. The light emitter 42 is carried with the support through the prescribed angular range moving back and forth along a first scanning axis 56. Thus, the light emitter 42 and the emitted light 22 is scanned along the first scanning axis 56.

Figure 5:
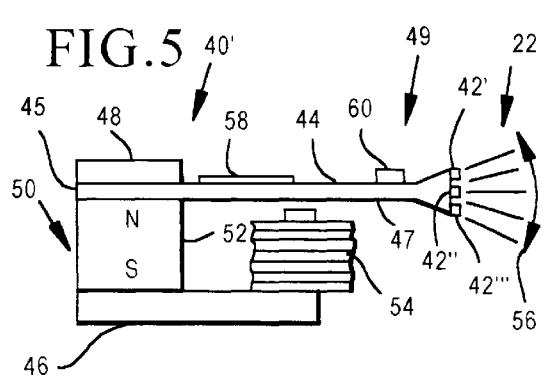
FIG. 5 is a side view of an apparatus for scanning a plurality of light emitters along a scanning axis according to an embodiment of this invention.

FIG. 5 shows an embodiment of a single-axis scanning source 40' which is the same as the source 40 of FIG. 3, but has a plurality of light emitters 42', 42", 42'". In one embodiment the light emitters 42', 42", and 42'" are respective red, green and blue light emitting diode point sources with optics for generating output beams of coherent light. In another embodiment the light emitters 42', 42", and 42'" are respective red, green and blue lased diode point sources. Preferably the emitters 42', 42", 42'" are aligned in a common plane and move with the support in such common plane. In FIG. 5 such common plane is the plane of the paper and includes the scanning axis 56.

Figure 6:
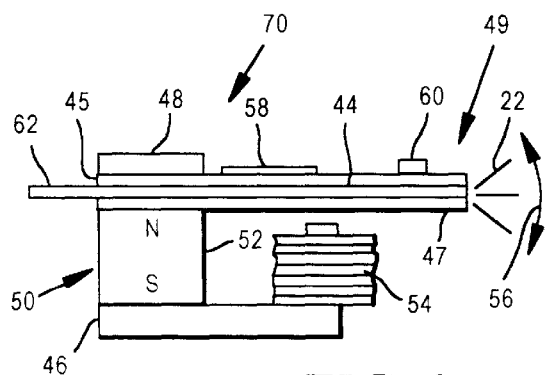
FIG. 6 is a side view of an apparatus for scanning a fiber optic light emitter along a scanning axis according to an embodiment of this invention.
Figure 7:
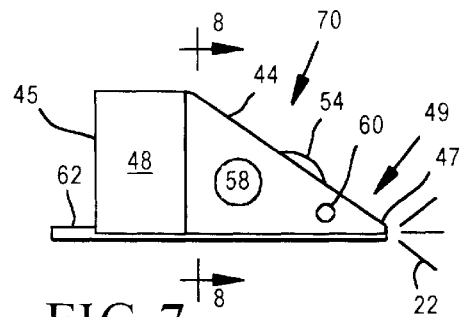
FIG. 7 is a top view of the apparatus of FIG. 6.
Figure 8:
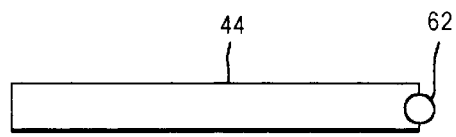
FIG. 8 is a sectional view of the apparatus of FIGS. 6 and 7 along line VIII—VIII of FIG. 7.
Figure 9:
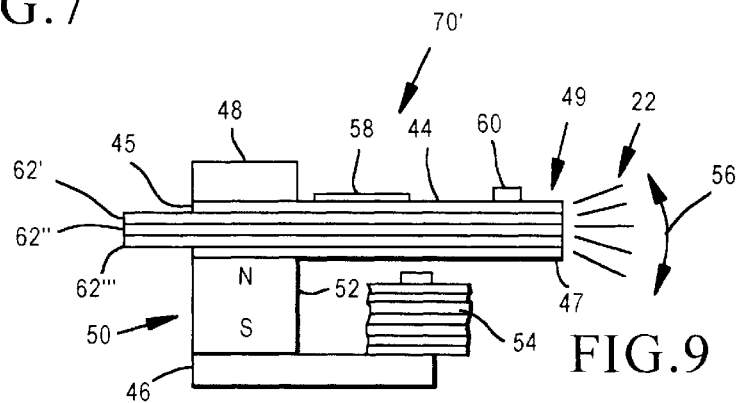
FIG. 9 is a side view of an apparatus for scanning a plurality of fiber optic light emitters along a scanning axis according to an embodiment of this invention.

FIGS. 6–8 show a similar scanning light source 70 in which like parts are given the same part numbers. The source 70 includes a fiber optic point source light emitter 62. FIG. 9 shows another scanning light source 70' including a plurality of fiber optic point light source emitters 62', 62", 62'" (e.g., red, green and blue light emitters) Again like parts are given the same part numbers as in the embodiments of FIGS. 3–8. The scanning light sources 40', 70, 70' operate in the same manner as described for the scanning light source 40. For the fiber optic point sources the fiber is bonded or otherwise attached to the plate 44. The distal end of the fiber is cleaved or includes a collimating lens.

Method for Scanning the Light Emitter(s)

To generate a portion of an image within the display field 14, the light emitter 42/62 or light emitters 42', 42", 42'"/62', 62", 62'" are scanned along the scanning axis 56. The light emitter(s) or a modulator which modulates the emitted light, receives the image signal 19. Where the light emitters 42', 42", 42'"/62', 62", 62'" are directly modulated, each of the emitters outputs light at an intensity corresponding to a component of the image signal to define a color component of an image pixel.

Figure 15:
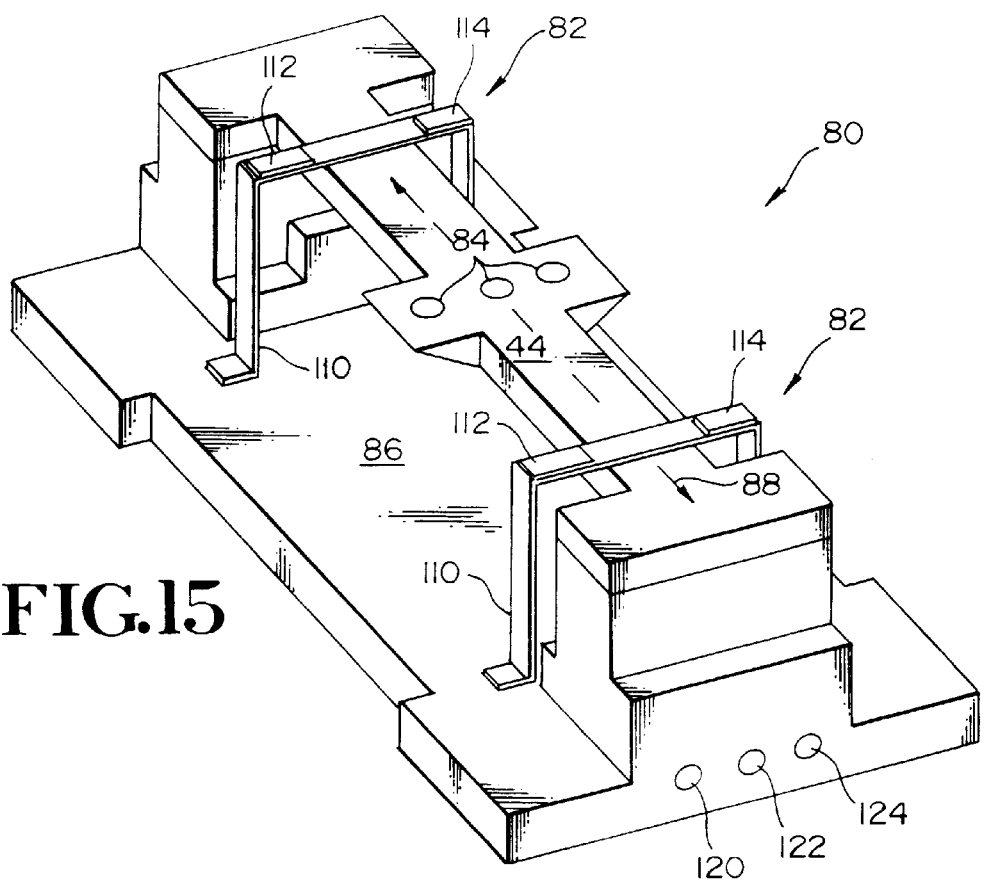
FIG. 15 is a perspective view of an apparatus for scanning a light emitter along a scanning path according to an alternative embodiment of this invention.
Figure 16:
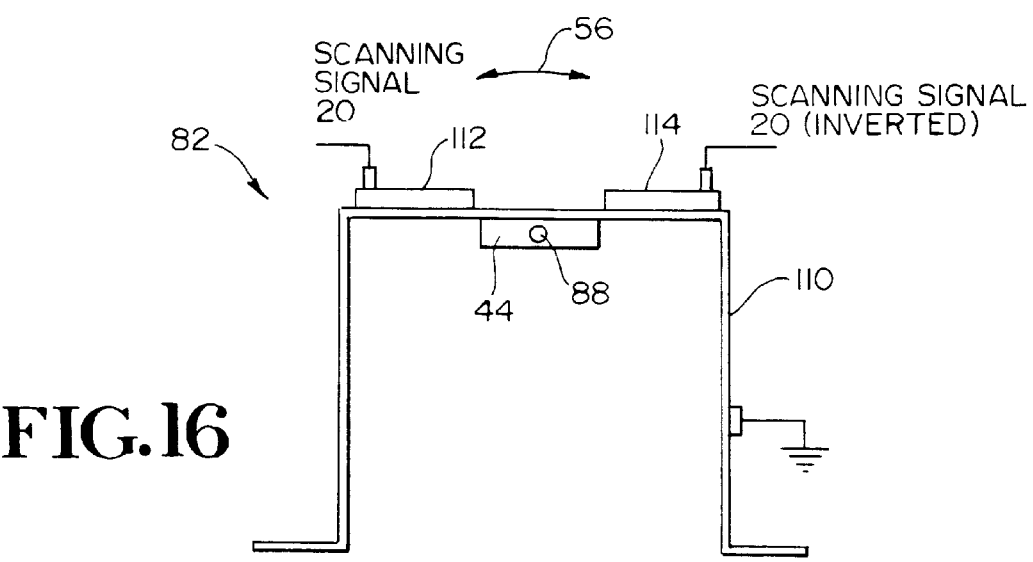
FIG. 16 is a side elevational view of a piezoelectric actuator of FIG. 15.

The drive circuit 50 generates a force which moves the support 44 and light emitter(s) along the prescribed scanning path. In the illustrated embodiments of FIGS. 3–9 the drive circuit 50 is an electromagnetic drive circuit. In the embodiment of FIGS. 15 and 16, which will be described below, the drive circuit is a piezoelectric actuator. The drive circuit 50 receives the scanning signal 20 and in response creates a changing force to move the support 44 and light emitter(s). In one embodiment the scanning signal is a periodic, horizontal synchronization signal having a horizontal scanning frequency and a corresponding horizontal scanning period. For a single emitter embodiment, the emitter 42/62 defines a line of image pixels during all or a portion of the scanning signal period. For unidirectional scanning one line is generated per scanning period. For bidirectional scanning one line is generated for each one-half of a scanning period. Thus, for bidirectional scanning, the emitter 42/62 moves in a first direction along the scanning axis 56 during a first half of the scanning period to generate one line of pixels. During such first half, the support 44 moves through the predetermined angle to a first extreme deflection position. During the second half of the scanning period, the emitter 42/62 moves in a second direction along the scanning path to generate another line of image pixels. During such second half, the support 44 moves through the predetermined angle to a second extreme deflection position. The support 44 and light emitter move along the scanning axis 56 through the predetermined angular range to either the first or second extreme deflection position for each image line. The motion of the support 44 and emitter is driven alternatively in first and second directions along the scanning axis 56 during subsequent scanning periods to generate additional lines of the image.

Figure 10:
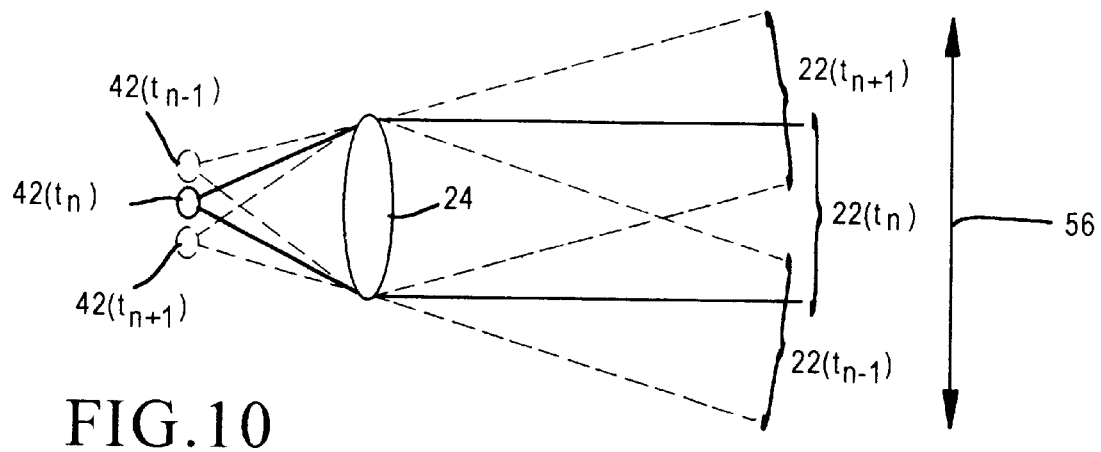
FIG. 10 is a diagram of the light beam generated by a single point source of light at different positions along the scanning path.

FIG. 10 shows the emitter 42/62 position at different times $t_{n-1}$, $t_n$, $t_{n+1}$ during a portion of a scanning period. The emitted light 22 impinges the optical subsystem 24 at differing angles corresponding to the differing times. The light 22 is directed toward differing image pixel locations in the display field 14 (e.g., image pixel addresses) along the scanning axis 56 at the different times.

Figure 11:
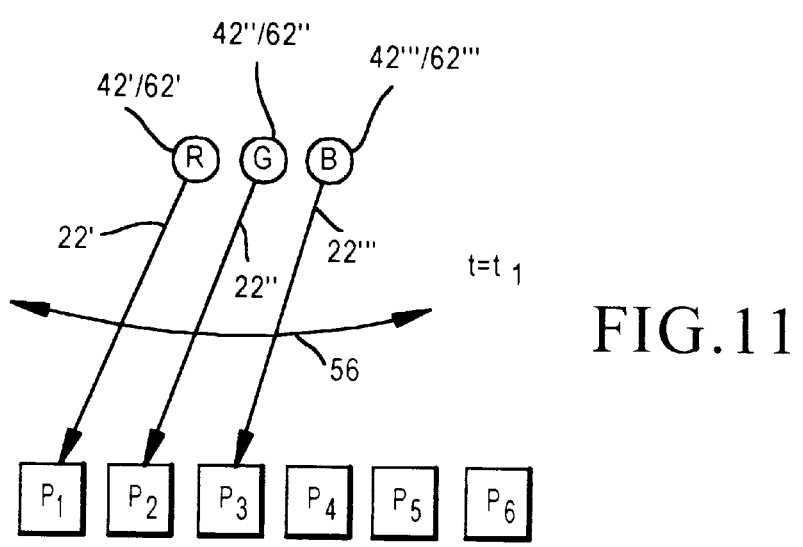
FIG. 11 is a diagram depicting image pixels scanned by a plurality of light sources at a given time $t_1$.
Figure 12:
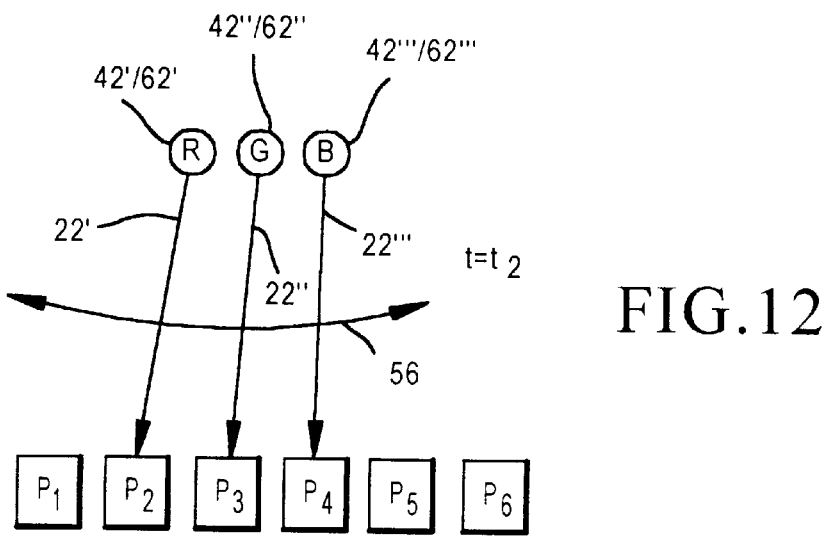
FIG. 12 is a diagram depicting image pixels scanned by the plurality of light sources of FIG. 12 at a later time $t_2$.
Figure 13:
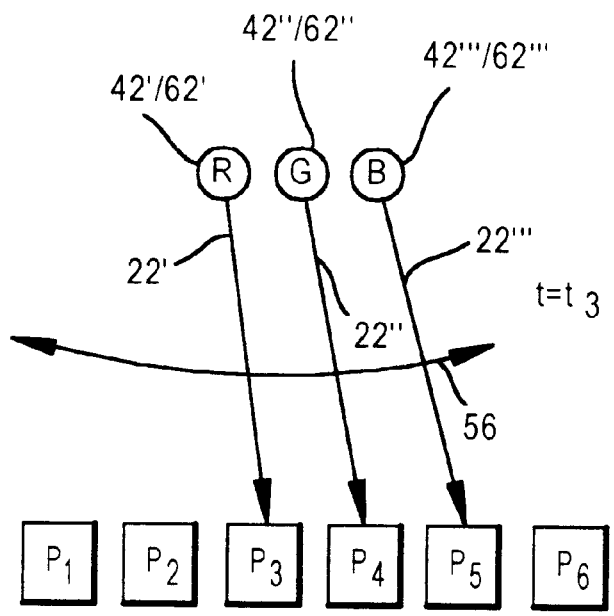
FIG. 13 is a diagram depicting image pixels scanned by the plurality of light sources of FIG. 12 at a later time $t_3$.

FIGS. 11–14 depict the method for scanning image pixels for an embodiment having a red emitter 42'/62', a green emitter 42"/62" and a blue emitter 42'"/62'". At any given time each of the three emitters is addressing a different pixel. FIG. 11 shows the emitters at time t=$t_1$. At such time emitter 42'/62"emits red light 22' directed to a location in the display field 14 corresponding to a pixel $P_1$. At the same time emitter 42'/62" emits green light directed to a location in the display field 14 corresponding to a pixel $P_2$ and emitter 42'"/62'" emits blue light directed to a location in the display field 14 corresponding to a pixel $P_3$. FIG. 12 shows the emitters at a later time t=$t_2$. At such time $t_2$ emitter 42'/62' emits red light 22' directed to a location in the display field 14 corresponding to pixel $P_2$. At the same time $t_2$ emitter 42"/62" emits green light directed to a location in the display field 14 corresponding to pixel $P_3$ and emitter 42'"/62'" emits blue light directed to a location in the display field 14 corresponding to a pixel $P_4$. FIG. 13 shows the emitters at a still later time t=$t_3$. At such time $t_3$ emitter 42"/62" emits red light 22' directed to a location in the display field 14 corresponding to pixel $P_3$. At the same time $t_3$ emitter 42"/62" emits green light directed to a location in the display field 14 corresponding to pixel $P_4$ and emitter 42'"/62'" emits blue light directed to a location in the display field 14 corresponding to a pixel $P_5$.

Figure 14:
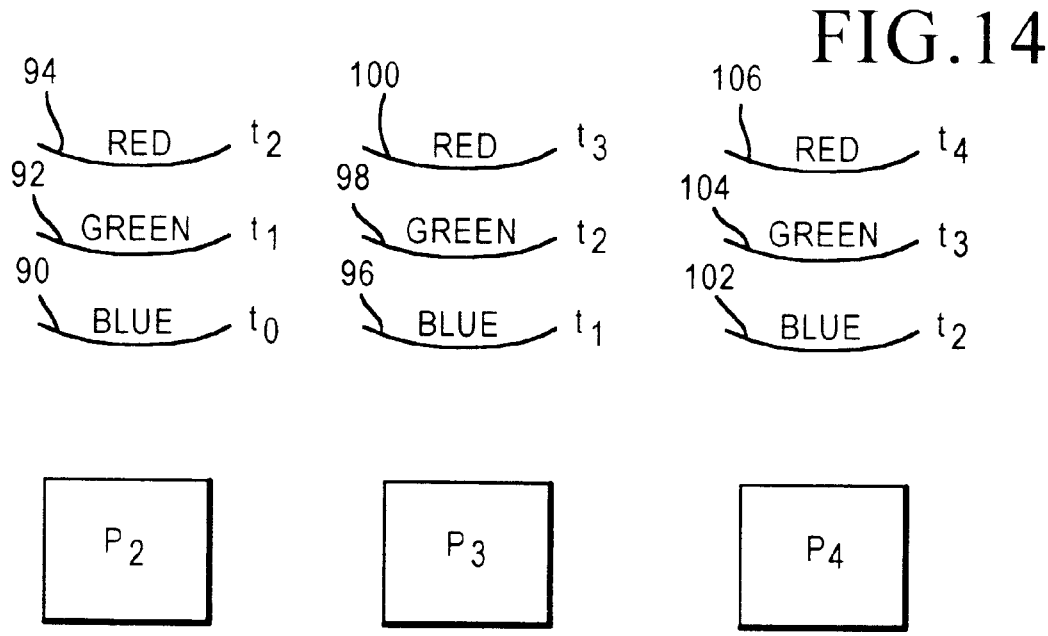
FIG. 14 is a diagram showing the timely light fronts from the respective light emitters which an image pixel.

FIG. 14 shows diagrammatically how wavefronts of red, green and blue light from the various emitters arrive sequentially at the pixel locations for pixels $P_2$, $P_3$, $P_4$. Pixel $P_2$ is formed by pixel component wavefronts 90, 92, 94 from the blue, green and red emitters impinging on the $P_2$ location at differing times $t_0$, $t_1$, and $t_2$, respectively. The time interval between wavefronts is very short—on the order of 650 microseconds. Because the retina integrates light energy, the user perceives the three sets of light energy as arriving substantially simultaneously. The user perceives the pixel as a combination of the red, green and blue light energy. Similarly, pixel $P_3$ appears to be formed by pixel component wavefronts 96, 98, 100 from the blue, green and red emitters impinging on the $P_3$ location at differing times $t_1$, $t_2$, and $t_3$, respectively. Pixel $P_4$ is formed by pixel component wavefronts 102, 104, 106 from the blue, green and red emitters impinging on the $P_4$ location at differing times $t_2$, $t_3$, and $t_4$, respectively.

To scan different lines of the image, in one embodiment the emitted light 22 impinges on a mirror 29 of a scanner 26. The scanner 26 receives a scanning signal 20' corresponding to a vertical synchronization signal. The scanner 26 steps the mirror 29 at increments corresponding to the time period to scan one horizontal line. After each horizontal line is scanned the mirror 29 moves to another angle so that the next horizontal line is scanned at a different vertical position. The vertical synchronization period is periodic having a period greater than the horizontal scanning period. In a raster scanning display, with every completion of a vertical scanning period, a raster pattern has been scanned in the display field 14. The raster pattern is repeated to scan subsequent frames of an image for subsequent periods of the vertical synchronization signal. On skilled in the art will recognize that, although the emitters 42 are described as having different colors, the emitters can be of the same color. This embodiment is of particular applicability where low power emitters are used. In such applications, the apparent pixel intensity will be determined by the integrated sum of the light intensities of the emitters 42.

Alternative Drive Circuit—Piezoelectric Actuator

FIG. 15 shows another embodiment 80 of a scanning light source 12, 12' in 1 5 which the drive circuit includes one or more piezoelectric actuators 82. The scanning light source 80 of FIG. 15 may be adapted to carry a plurality of light emitters 84 in a similar manner as described for the sources 40' and 70'. The light emitters of the source 80 may be light emitting diodes (see FIGS. 3–5), fiber optics (see FIGS. 6–9), light emitting plasmas, or other point sources of light. Each point source emits or is adapted with optics to emit a beam of coherent light.

The scanning light source 80 includes support 44, a base 86, one or more piezoelectric actuators 82 and one or more light emitters 84. The light emitters 84 are coupled to the support 44 and carried by the support 44 during motion about an axis of rotation 88. The axis of rotation 88 defines the scanning axis 56 along which the emitted light scans. The base includes electrical connectors 120, 122, 124. Each connector is electrically coupled to a corresponding one of the respective light emitters 84. In some embodiments the image signal or an appropriate component of the image signal is received at respective connectors 120, 122, 124 for modulating the light emitters 84.

In one embodiment the support 44 is formed of spring steel and is a cantilever 30 type of spring. The cantilever spring has a spring constant determined by its length, width and thickness. Preferably, the support 44 has a high Q value such that once the support starts moving very little energy is lost. As a result, very little energy is added during each period of movement to maintain a constant frequency of motion of the support 44.

Referring to FIG. 16, the piezoelectric actuator 82 includes a frame 110 which 35 carries a plurality of piezoelectric volumes 112, 114. The volumes 112, 114 are symmetrically positioned relative to the support 44. The volume 112 receives the scanning signal 20 from the image data interface 18. The volume 114 receives an inversion of the scanning signal 20. The scanning signals are periodic having a changing amplitude. As a result, the volumes 112, 114 having a changing deformation. During one portion of the scanning signal period the volume 112 gets longer and thinner, while the other volume 114 gets shorter and fatter. As a result the support 44 is driven about the axis 88 in a first direction to a first extreme deflection. During another portion of the scanning period, the volume 112 gets shorter and fatter, while the volume 114 gets longer and thinner. As a result, the support 44 is driven about the axis 88 in the opposite direction to a second extreme deflection. The light sources 84 are carried with the support 44 moving along the scanning axis 56. In a preferred embodiment the period of the scanning signal 20 corresponds to the natural resonant frequency of the moving parts (e.g., frame 110, volumes 112, 114, support 44 and light emitter(s) 84).

Preferably the scanning source 80 includes a position sensor for monitoring the position of the support 44 and light emitter 84. In some embodiments a common mode rejection piezoelectric sensor is used. An exemplary sensor 58 is described in U.S. Pat. No. 5,694,237 issued Dec. 2, 1997 entitled "Position Detection of Mechanical Resonant Scanner Mirror," naming inventor Charles D. Melville, which is incorporated by reference.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A scanning display apparatus, comprising:
   an image signal source operative to produce an image signal;
   a scanning signal source generating a scanning signal;
   a light emitter coupled to the image signal source and responsive to the image signal to emit light;
   a support carrying the light emitter at a first portion of the support; and
   a drive circuit coupled to the support and responsive to the scanning signal to move at least the first portion of the support through a predetermined angular range, wherein the light emitter is moved through said predetermined angular range to scan the emitted light along a desired scan path.

2. The apparatus of claim 1, in which the light emitter comprises a plurality of light emitting devices emitting respective beams of light, and wherein the respective beams of light scan an image.

3. The apparatus of claim 2, in which the respective beams of light are of a monotone.

4. The apparatus of claim 2, in which the respective beams of light are of a differing color.

5. The apparatus of claim 1, in which the light emitter comprises a point source of light and a modulator positioned to receive the emitted light and responsive to the image signal.

6. The apparatus of claim 1, in which the light emitter is directly modulated in response to the image signal.

7. The apparatus of claim 1, in which the light emitter comprises a light emitting diode.

8. The apparatus of claim 1, in which the light emitter comprises a plurality of light emitting diodes of differing wavelength.

9. The apparatus of claim 1, in which the light emitter comprises a plurality of light emitting diodes of the same wavelength.

10. The apparatus of claim 1, in which the light emitter comprises a fiber optic.

11. The apparatus of claim 1, in which the light emitter comprises a light emitting plasma.

12. The apparatus of claim 1, in which the light emitter comprises a plurality of light emitting devices emitting respective beams of colored light, wherein the plurality of light emitting devices are aligned in a common plane, wherein the movement of the plurality of light emitters caused by the drive circuit occurs with the common plane, and wherein the image signal is operative with a timing to modulate each one of the light emitters to define an image pixel of a desired color at a given pixel location as each one of the light emitters is in position to address said image pixel.

13. The apparatus of claim 1, in which the drive circuit is an electromagnetic drive circuit.

14. The apparatus of claim 13, further comprising a clamp, in which the drive circuit comprises an electromagnetic coil and a permanent magnet, in which the support comprises a cantilever spring responsive to a changing magnetic field, the cantilever spring having a first end held fixed relative to the permanent magnet by the clamp and a second end which moves through said predetermined angular range in response to the changing magnetic field, and wherein the electromagnetic coil receives the scanning signal and in response generates the changing magnetic field.

15. The apparatus of claim 1, in which the drive circuit comprises a piezoelectric actuator.

16. The apparatus of claim 1, wherein the support and light emitter move at a resonant frequency of said support and light emitter.

17. The apparatus of claim 1, wherein the drive circuit moves the support through the predetermined angular range at a resonant frequency of said support and light emitter.

18. The apparatus of claim 1, wherein the scanning signal is a periodic, display synchronization signal.

19. The apparatus of claim 1, wherein the support is a cantilever spring and the movement of the cantilever spring is a twisting motion which causes the light emitter to rotate about an axis of rotation.

20. The apparatus of claim 1, further comprising an eyepiece receiving the emitted light, and wherein the emitted light is focused to define an exit pupil at a location adjacent the eyepiece where a viewer's eye may be positioned to perceive an image generated by the apparatus.

21. The apparatus of claim 1, in which the desired scan path occurs along a first axis, and further comprising a scanner having a mirror which receives the emitted light to deflect the emitted light along a second axis.

22. The apparatus of claim 20, in which the first axis is a horizontal axis and the second axis is a vertical axis, and the deflected emitted light moves along a raster pattern to scan an image.

23. A scanning display apparatus, comprising:
   an image signal source operative to produce an image signal;
   a scanning signal source generating a scanning signal;
   a light emitter coupled to the image signal source and responsive to the image signal to emit light;
   a support carrying the light emitter at a first portion of the support and moving in response to the scanning signal to move at least the first portion of the support through a predetermined angular range, wherein the light emitter is moved through said predetermined angular range to scan the emitted light along a desired scan path.

24. The apparatus of claim 22, in which the light emitter comprises a plurality of light emitting devices emitting respective beams of light, and wherein the respective beams of light scan an image.

25. The apparatus of claim 22, in which the light emitter comprises a point source of light and a modulator positioned to receive the emitted light and responsive to the image signal.

26. The apparatus of claim 22, in which the light emitter comprises a light emitting diode.

27. The apparatus of claim 22, in which the light emitter comprises a fiber optic.

28. The apparatus of claim 22, in which the light emitter comprises a light emitting plasma.

29. A retinal scanning display apparatus, comprising:
   an image signal source operative to produce an image signal;
   a scanning signal source generating a first periodic scanning signal and a second periodic scanning signal;
   a light emitter coupled to the image signal source and responsive to the image signal to emit light;
   a support carrying the light emitter at a first portion of the support;
   a drive circuit coupled to the support and responsive to the first scanning signal to move at least the first portion of the support through a predetermined angular range, wherein the light emitter is moved through said predetermined angular range to scan the emitted light along a desired scan path for a first scanning axis;

a scanner for scanning the emitted light along a second scan path for a second scanning axis; and an eyepiece receiving the emitted light being scanned for the first scanning axis and the second scanning axis, wherein the emitted light is focused to define an exit pupil at a location adjacent the eyepiece where a viewer's eye may be positioned to perceive an image.

30. The apparatus of claim 28, in which the first axis is a horizontal axis and the second axis is a vertical axis, and the emitted light moves along a raster pattern to scan the image.

31. The apparatus of claim 28, in which the light emitter comprises a plurality of light emitting devices emitting respective beams of colored light, and wherein the respective beams of colored light scan an image.

32. The apparatus of claim 28, in which the light emitter comprises a light emitting diode.

33. The apparatus of claim 28, in which the light emitter comprises a fiber optic.

34. The apparatus of claim 32, in which the drive circuit is an electromagnetic drive circuit.

35. The apparatus of claim 32, in which the drive circuit comprises a piezoelectric actuator.

36. The apparatus of claim 32, wherein the drive circuit moves the support through the predetermined angular range at a resonant frequency of said support and light emitter.

37. The apparatus of claim 38, in which the light emitter comprises a light emitting plasma.

38. The apparatus of claim 38, in which the light emitter comprises a plurality of light emitting devices emitting respective beams of colored light, wherein the plurality of light emitting devices are aligned in a common plane, wherein the movement of the plurality of light emitters caused by the drive circuit occurs with the common plane, and wherein the image signal is operative with a timing to modulate each one of the light emitters to define an image pixel of a desired color at a given pixel location as each one of the light emitters is in position to address said image pixel.

39. The apparatus of claim 28, in which the drive circuit is an electromagnetic drive circuit.

40. The apparatus of claim 28, in which the drive circuit comprises a piezoelectric actuator.

41. The apparatus of claim 28, wherein the drive circuit moves the support through the predetermined angular range at a resonant frequency of said support and light emitter.

42. The apparatus of claim 28, wherein the support is a cantilever spring and the movement of the cantilever spring is a twisting motion which causes the light emitter to rotate about an axis of rotation.

43. A method of scanning an optical beam responsive to a scanning signal, comprising the steps of:

modulating a light emitter with an image signal to generate a modulated light beam of image pixel components;

receiving a scanning signal at a drive circuit operative to drive motion of a support, the support carrying the light emitter;

moving the support through a predetermined angular range as controlled by the drive circuit, wherein the light emitter is moved through said predetermined angular range with the support to scan the emitted light along a desired scan path.

44. The method of claim 42, in which the scanning signal is periodic having a period which includes a first portion and a second portion, and in which the step of moving comprises:

during the first portion of the scanning signal period, driving motion of the support and light emitter in a first direction to a first extreme position in response to the scanning signal;

during a second portion of the scanning signal period, driving motion of the support and light emitter in a second direction opposite the first direction to a second extreme position in response to the scanning signal; and repeating the steps of receiving, driving in a first direction and driving in a second direction for subsequent periods of the scanning signal to generate oscillatory motion of the support and light emitter in alternating first and second directions during the respective first and second portions of said subsequent scanning signal periods to scan a plurality of lines of image pixel components of an image.

45. The method of claim 42, in which the support carries a plurality of light emitters, and wherein the step of modulating comprises modulating the plurality of light emitters with the image signal to generate respective modulated light beams at a timing which creates image color pixels.

46. The method of claim 42, further comprising the step of receiving the emitted light at an eyepiece which focuses the emitted light to define an exit pupil at a location adjacent the eyepiece where a viewer's eye may be positioned to perceive an image.

47. The method of claim 42, in which the desired scan path occurs along a first scanning axis, and further comprising the step of:

receiving the emitted light at a scanner mirror which moves relative to a second scanning axis; and deflecting the emitted light with the mirror along the second scanning axis.

48. The method of claim 46, in which the first scanning axis is a horizontal axis and the second scanning axis is a vertical axis, and wherein the deflected emitted light moves along a raster pattern to scan an image.

49. The method of claim 42, in which the support is responsive to a changing magnetic field, and further comprising the step of generating a changing magnetic field with the drive circuit in response to the scanning signal to drive motion of the support.

50. The method of claim 42, in which the support is coupled to a piezoelectric actuator, and further comprising the step of deforming the piezoelectric actuator in response to the scanning signal to drive motion of the support.

51. The method of claim 42, in which the light emitter is a point source of light, and in which the step of modulating comprises modulating the point source with the image signal to generate modulated light defining, over time, a plurality of image pixel components.

52. The method of claim 42, in which the light emitter comprises a plurality of point sources of light of respective color, wherein the plurality of point sources are aligned in a common plane, in which the step of modulating comprises modulating the plurality of point sources with the image signal, in which the step of moving comprises moving the plurality of point sources through the predetermined angular range in the common plane, and wherein the image signal is operative with a timing to modulate each one of the point sources so that the plurality of point sources cumulatively define an image pixel of a desired color at a given pixel location as each one of the plurality of point sources is in position to address said image pixel.

53. The method of claim 42, in which the support carries a plurality of light emitters which output respective beams of light, and wherein the step of modulating comprises modulating the respective beams of light with the image signal to generate respective modulated light beams at a timing which creates image color pixels.

* * * * *